US006993226B2

(12) United States Patent
Castellani et al.

(10) Patent No.: US 6,993,226 B2
(45) Date of Patent: Jan. 31, 2006

(54) EASY TEARABLE CABLE COMPONENT AND TELECOMMUNICATION CABLE COMPRISING SAID COMPONENT

(75) Inventors: Luca Castellani, Corsico (IT); Giovanni Brandi, Milan (IT); Massimiliano Pavan, Verdello (IT)

(73) Assignee: Pirelli & C. S.p.A., Milan (IT)

( * ) Notice: Subject to any disclaimer, the term of this patent is extended or adjusted under 35 U.S.C. 154(b) by 0 days.

(21) Appl. No.: 10/497,152

(22) PCT Filed: Nov. 28, 2001

(86) PCT No.: PCT/EP01/13882

§ 371 (c)(1),
(2), (4) Date: May 28, 2004

(87) PCT Pub. No.: WO03/046074

PCT Pub. Date: Jun. 5, 2003

(65) Prior Publication Data

US 2005/0063650 A1    Mar. 24, 2005

(51) Int. Cl.
G02B 6/44    (2006.01)
(52) U.S. Cl. .................. 385/100; 385/141; 385/142; 385/143; 385/144; 385/145
(58) Field of Classification Search ............... 385/100, 385/141–145; 427/162, 163.1, 163.2
See application file for complete search history.

(56) References Cited

U.S. PATENT DOCUMENTS 4,909,593 A    3/1990    Harbort et al. .......... 350/96.23

2003/0173104 A1*  9/2003  Dell'Anna et al. ...... 174/126.1

FOREIGN PATENT DOCUMENTS

| EP | 0 400 333 A2 | 12/1990 | ............. 385/141 X |
| EP | 1 024 382 A2 | 8/2000 | ............. 385/141 X |
| WO | 00/58768 | 10/2000 | ............. 385/141 X |
| WO | 01/48075 A1 | 7/2001 | ............. 385/141 X |

OTHER PUBLICATIONS

Dallas et al.; "Thermal and Mechanical Optimization of Easy-Access Flexible Buffering Materials", 49th International Wire & Cable Symposium, pp. 357-361, (2000).
Jones et al.; "Crystalline Forms of Isotactic Polypropylene", Macromolecular Chem. 75, pp 134-158, (1964).
Mettler-Toledo GmbH, Collected Applications, Thermal Analysis, Thermoplastics, pp. 2-4 and 18-21, (1997).

* cited by examiner

Primary Examiner—Brian Healy
Assistant Examiner—Jerry Martin Blevins
(74) Attorney, Agent, or Firm—Finnegan, Henderson, Farabow, Garrett & Dunner, L.L.P.

(57) ABSTRACT

Telecommunication cable having a tubular element, in particular a buffer tube housing at least one transmission element. The tubular element has a polymeric composition which allows an easy tearing of the element, in order to get access to the transmission element housed therein. The tubular element is made from a polymeric composition having a heterophasic olefin copolymer which has at least one amorphous phase having sequences deriving from copolymerization of at least two different olefin monomers, at least a first crystalline phase having sequences deriving from the homopolymerization of a first olefin monomer and at least a second crystalline phase having sequences deriving from the homopolymerization of a second olefin monomer.

32 Claims, 6 Drawing Sheets

EASY TEARABLE CABLE COMPONENT AND TELECOMMUNICATION CABLE COMPRISING SAID COMPONENT

CROSS REFERENCE TO RELATED APPLICATIONS

This application is a national phase application based on PCT/EP01/13882, filed Nov. 28, 2001, the content of which is incorporated herein by reference.

FIELD OF THE INVENTION

The present invention relates to a telecommunication cable comprising a cable component, in particular a buffer tube or a sheath housing at least one transmission element, said component comprising a polymeric composition which allows an easy tearing of said component, in order to get access to the transmission element housed therein.

BACKGROUND ART

Transmission elements, in particular coated optical fibers, used in telecommunication cables are typically protected, either individually or as a group, by buffering materials or elements.

For instance, one or more optical fiber, group, bundle or ribbon of optical fibers may be protected by a polymeric material in the form of a tube or of a flexible sheath. The optical fiber together with its protective element is generally referred to in the art as "optical unit". An optical cable may contain a single optical unit or a plurality of optical units. Said single or plurality of optical units is generally referred to as the optical core of the cable. The optical core is in turn typically inserted into a protecting polymeric sheath.

U.S. Pat. No. 4,909,593 discloses an optical cable comprising several multiple-fiber optical units disposed within a tube made of a rigid, hardly shrinking plastic. Each of said unit consists of several optical fibers and of an envelope of soft plastic which can be easily removed with bare fingers. Suitable plastics are thermoplastic elastomers vulcanizable at room temperature, or soft thermoplastic elastomers such as polyesteramide copolymers, soft ethylene-propylene copolymers, or a styrene-butadiene rubber.

EP patent application no. 1 024 382 discloses a telecommunication cable comprising a flexible buffer tube made from a thermoplastic polyolefin elastomer having a modulus of elasticity below 500 Mpa at room temperature and a modulus of elasticity below 1500 Mpa at −40° C. Examples of suitable elastomers are ethylene-propylene copolymers, preferably with more than 10 percent of ethylene monomer, terpolymers containing propylene-ethylene, ultra low density polyethylene or ethylene-octene copolymers, preferably containing more than 10% by weight of octene monomer. The elastomer can also contain inorganic fillers for controlling physical parameters, such as mechanical properties and flame retardancy.

The article from G. Dallas et al., "Thermal and Mechanical Optimization of Easy-Access Flexible Buffering Materials", 49$^{th}$ International Wire & Cable Symposium, 2000, pp. 357–361 discloses the use of mixtures of hard impact-resistant polypropylene and of a soft grade impact-resistant polypropylene, optionally in admixture with soft ethylvinylacetate copolymers, for making flexible optical buffer tubes. As mentioned in said article, improved access to the fiber bundle housed within the tube (as compared to a conventional PVC sheath) is obtained by an easier removal of the polypropylene sheath by tearing said sheath with a ripcord disposed within said sheath.

The Applicant has now found that by using a polymeric material comprising an heterophasic olefin copolymer having at least one amorphous phase and at least two different crystalline phase, it is possible to manufacture tubular elements for telecommunication cables which have improved tearableness.

Along the present description and claims, the term "tubular element" is intended to include within its meaning any element which has or can be disposed in a tubular form within the cable structure. Examples of such tubular elements are buffer tubes housing at least one transmission element or polymeric sheaths disposed to surround inner portions of a telecommunication cable, e.g. one or more buffer tubes. Said polymeric sheath is preferably in the form of a tube (e.g. extruded about said inner portion) or alternatively can be a tape disposed about said inner portion (thus taking a tubular form), either helically wrapped or preferably folded along its longitudinal direction about said inner portion.

SUMMARY OF THE INVENTION

An aspect of the present invention thus relates to a telecommunication cable comprising a tubular element of polymeric material and at least one transmission element housed within said tubular element, wherein said polymeric material is made from a polymeric composition comprising a heterophasic olefin copolymer which comprises:

a) at least one amorphous phase comprising sequences deriving from copolymerisation of at least two different olefin monomers;

b) at least a first crystalline phase comprising sequences deriving from homopolymerization of a first olefin monomer; and c) at least a second crystalline phase comprising sequences deriving from homopolymerization of a second olefin monomer.

Preferably said at least two different monomers of the amorphous phase are the first and the second monomer of the first and second crystalline phase, respectively.

The term olefin monomer includes within its meaning any olefin comprising from 2 to 12 carbon atoms, preferably with the insaturation on the alpha carbon, i.e. the first carbon atom of the polymeric chain. Preferably, said olefin monomer is a compound of formula $CH_2=CH-R$, wherein R is hydrogen or a linear or branched alkyl containing from 1 to 10 carbon atoms. Examples of suitable olefins are, for instance, ethylene, propylene, 1-butene, 1-pentene, 1-hexene, 4-methyl-1-pentene, 1-octene, 1-dodecene and the like.

Preferably said first and second crystalline phases have a melting point higher than about 100° C., more preferably higher than about 110° C.

Preferably, said at least first crystalline phases has a melting point of at least 140° C. or higher, more preferably of at least 150° C. or higher.

According to a preferred aspect, said tubular element is a buffer tube housing said at least one optical fiber. Preferably, said buffer tube is defined by a peripheral wall having a thickness of less than about 0.5 mm, preferably less than about 0.2 mm, down to about 0.05 mm.

Advantageously, the amount of the amorphous phase in the heterophasic copolymer is of at least about 50 percent of the total weight of the heterophasic polymer. The amount of said amorphous phase is preferably lower than about 90 percent of the total weight of heterophasic copolymer. Preferably, the amount of said amorphous phase is from about 60% to about 90% of the total weight of heterophasic copolymer, more preferably from about 65% to about 85%.

The amount of each of said first and second crystalline phase is preferably of at least about 2 percent of the total weight of the copolymer. Said amount is however preferably not higher than about 30 percent of the total weight. More preferably, said amount is from about 5 percent to about 25 percent of the total weight of the heterophasic copolymer.

Preferably, the relative ratio by weight between said first and said second crystalline phases is from about 1:2 to about 7:1, more preferably from 2:3 to about 3:1.

Preferably said heterophasic olefin copolymer is an ethylene-propylene based copolymer comprising a crystalline phase of polypropylene homopolymer and a crystalline phase of polyethylene homopolymer.

Said ethylene-propylene based copolymer may optionally comprise an α-olefin co-monomer, different from polypropylene preferably selected from: 1-butene, 1-pentene, 1-hexene, 4-methyl-1-pentene, 1-octene and 1-dodecene and the like. Optionally said ethylene-propylene based copolymer may further contain a diene co-monomer, which is preferably selected from: linear, conjugated or non-conjugated diolefins, for example 1,3-butadiene, 1,4-hexadiene, 1,6-octadiene and the like; monocyclic or polycyclic dienes, for example 1,4-cyclohexadiene, 5-ethylidene-2-norbornene, 5-methylene-2-norbornene and the like.

Optionally, said polymeric composition further comprises a homopolymer of said first or second olefin monomer having a crystalline phase comprising sequences deriving from the homopolymerization of said respective first or second monomer. The amount of crystalline phase in said homopolymer is from about 20% to about 50% of the total weight of homopolymer. The weight ratio between said homopolymer and said heterophasic copolymer is preferably from about 1:2 to about 1:1. Said homopolymer is preferably polyethylene, more preferably a linear low density polyethylene.

Preferably said polymeric composition further comprises an inorganic filler dispersed therein. Preferably the amount of inorganic filler is from about 40% to about 90% of the total weight of the polymeric composition, more preferably from about 50% to about 85%, even more preferably from about 60% to about 80%.

According to a preferred aspect, the polymeric material forming the tubular element according to the invention has an elongation at break not greater than 500%, preferably not greater than 400%.

In the present description and claims the term "sequences deriving from homopolymerisation of a monomer" includes within its meaning polymeric chains or portions thereof constituted essentially by the same monomeric unit, where "essentially" means that said sequences may contain, further to the said monomeric unit, also minor amounts of other co-monomer(s), which do not however impair the capability of said sequences to form the desired crystalline phase.

Similarly, the term "sequences deriving from copolymerisation of at least two monomers" includes within its meaning polymeric chains or portions thereof constituted by at least two different monomeric units.

In the present description and claims, the term "crystalline phase" is referred to any fraction of the heterophasic polymer which shows, upon Differential Scanning Calorimetry (DSC) analysis, an appreciable enthalpy of fusion, e.g. of at least 3 J/g, preferably of at least 5 J/g, in correspondence with the typical melting temperature of the respective homopolymer.

DETAILED DESCRIPTION OF THE INVENTION

Figure 1:
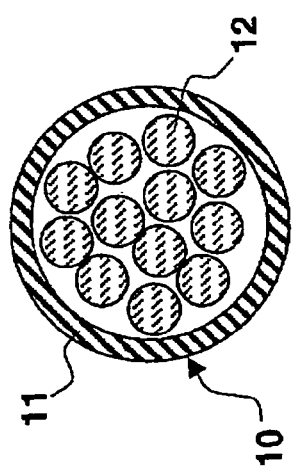
FIG. 1 shows an example of a tubular element according to the invention.

FIG. 1 shows an example of a tubular element according to the invention. In this embodiment, said a tubular element is in the form of a buffer tube 10 comprising a polymeric sheath 11 which envelopes a plurality of transmitting elements 12. The polymeric sheath 11 is made from a polymeric material as above defined. Transmission elements are preferably optical fibers which can be disposed inside the tube either individually, as ribbons or grouped into bundles. The optical fibers can be, for example, single-mode fibers, multi-mode fibers, dispersion-shifted (DS) fibers, non-zero dispersion (NZD) fibers, or fibers with a large effective area and the like, depending on the application requirements of the cable. They are generally fibers with an outside diameter of between 230 and 270 $\mu$m. If desired, some of the optical fibers housed inside said buffer tube can be replaced by non-transmitting glass fibers, in order to reach the optimal count within the tube, without varying the dimensions of the tube. The buffer tube can further contain waterblocking means, in the form of grease like filler or preferably in the form of water swellable powder compositions. For instance a composition comprising a mixture of polyacrylate water swellable particles and inert talc particles, as described in International Patent Application WO 00/58768, herein incorporated by reference, can be used.

In a preferred embodiment, a buffer tube according to the invention has an inner diameter which is slightly larger (typically less than about 0.2 mm) than the outer diameter of the bundle of fibers housed therein, i.e. according to the so-called "semi-tight" or "near-tight" configuration. For instance, while a bundle of twelve optical fibers (each having a diameter of about 0.250 mm) has an outer diameter of about 1.05 mm, the inner diameter of the respective buffer tube housing said bundle of fibers will be of about 1.15.

The sheath forming the buffer tubes, in particular in the "near-tight" configuration, has preferably a thickness of less than about 0.2 mm, more preferably from about 0.05 mm to about 0.15 mm. Particularly preferred is a thickness of from about 0.075 mm to about 0.1 mm.

For the sake of conciseness, polymeric buffer tubes directly housing at least one optical fiber therein, such as the one illustrated in FIG. 1, will be referred to in the following of this specification as "optical sub-units". In more general terms, the expression "optical sub-unit" is referred in the present description and claims to any tubular element directly housing at least one transmission element within it.

The buffer tube illustrated in FIG. 1 can be employed and installed either as such or preferably as a sub-unit in an optical fiber cable.

Figure 2:
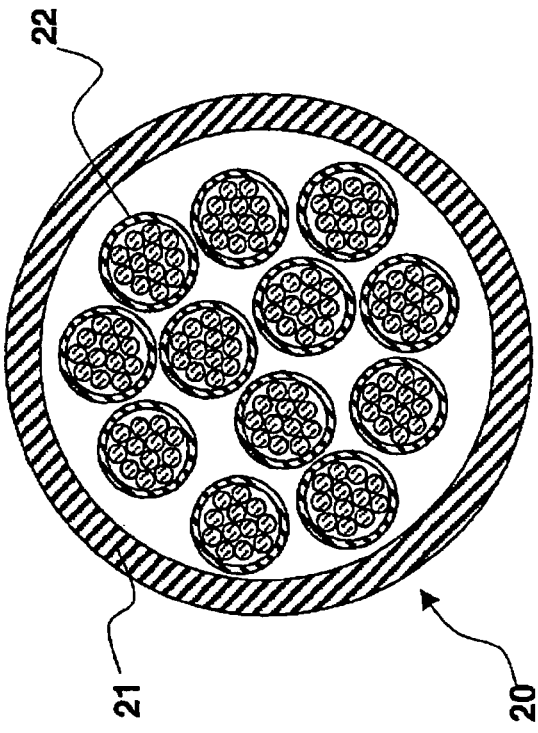
FIG. 2 shows a further example of a tubular element according to the invention.

FIG. 2 shows another example of a tubular element according to the invention. Said element is a tube 20 comprising a polymeric sheath 21 made from a polymeric composition as above defined, which contains one or more optical sub-units 22, which are preferably in the form of a tube. Said sub-units may comprise a polymeric sheath of known materials (for instance polyethylene, ethylene-propylene copolymers, ethylene-vinylacetate copolymers or mixtures thereof) encircling the optical fibers or, preferably, the polymeric sheath is made from a polymeric composition as the one of the sub-unit 10 illustrated in FIG. 1. The interstitial spaces between the optical sub-units can be empty or preferably filled with a water blocking material, such as for instance water swellable powders or water swellable yarns. The group of optical sub-units can further be wrapped by a water blocking tape, e.g. a tape of non-wowen material comprising water absorbing particles. If desired, in particular when the tube 20 is used as a telecommunication cable, i.e. without any further protective outer sheath, a couple of longitudinal reinforcing elements (not shown) can be embedded in the polymeric sheath, similarly to the reinforcing elements 33 shown in FIG. 3. Optionally, in addition or alternatively to the above longitudinal reinforcing elements, additional strength member (not shown), e.g. in the form of polymeric yarns (e.g. Kevlar®) can be disposed between said outer jacket and the bundle of sub-units, totally or partially encircling the bundle of sub-units.

For the sake of conciseness, a polymeric tube with a polymeric sheath housing at least one optical sub-unit within it will be referred to in the following of this specification and claims as "optical unit". Depending on the number and dimensions of the sub-units to be housed therein, the tube forming the optical unit may have an outside diameter of between 3 and 25 mm and a thickness of between 0.5 and 3 mm. In more general terms, the expression "optical unit" is referred to any tubular element housing at least one optical sub-unit within it.

An optical unit according to the invention can be employed and installed either as such or as an element of an optical fiber cable.

Figures 3, 4:
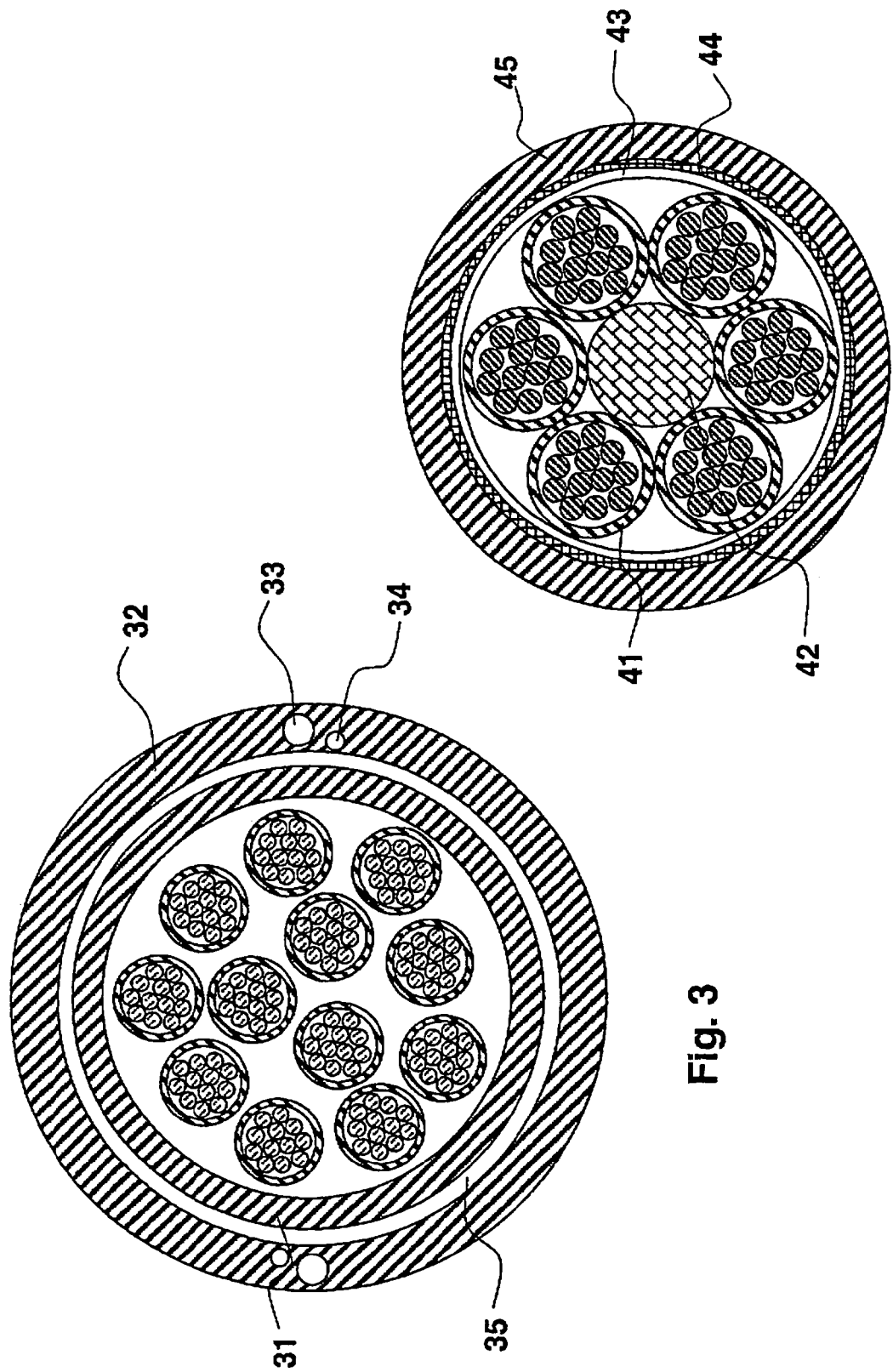
FIG. 3 shows an example of a telecommunication cable according to the invention.
FIG. 4 shows a further example of a telecommunication cable according to the invention.

An optical unit can be used for instance in an optical cable according to FIG. 3, where said optical unit 31 is surrounded by an outer polymeric jacket 32, made for instance from polyethylene (e.g. medium or high density polyethylene, MDPE or HDPE), optionally with inorganic fillers added to optimize its flame resistance and its emission of fumes. The optical unit 31 may comprise a polymeric sheath according to the invention (e.g. like the unit illustrated in FIG. 2) or, when the polymeric sheath is made from a conventional material, it contains at least one optical sub-unit according to the invention, such as, for instance, the one illustrated in FIG. 1. Reinforcing elements 33, for instance two GRP (glass reinforced polymer) rods, and optionally ripcords 34 are embedded in the outer jacket 32. A layer of non-stick material 35 is advantageously inserted between said outer sheath 32 and said optical unit 31, this layer preventing the sheath and the inner tube from sticking together during extrusion of the cable. This material is, for example, a paper tape.

Optionally, an additional strength member (not shown), e.g. in the form of polymeric yarns (e.g. Kevlar®) is disposed between said outer jacket 32 and said tube 31.

Alternatively, as shown in FIG. 4, a plurality of optical units 41, either like the one illustrated in FIG. 2 or, in case the polymeric sheath being made from a conventional material, containing an optical sub-unit as illustrated in FIG. 1, can be stranded around a central strength member 42, e.g. a plastic coated metallic or GRP wire. The optical units are preferably arranged in an open helix pattern (or S-Z stranding) around the axis of the cable, i.e. the tubes are bundled around the axis of the cable in sections with a first direction of stranding (in S form), alternating with sections with an opposite direction of stranding (in Z form). The stranded optical units are optionally wrapped by a water blocking tape 43 and a layer 44 of high strength polymeric yarns (e.g. Kevlar®) is optionally disposed to surround the optical core. The cable is then protected by an outer jacket 45, e.g. of MDPE or HDPE. Optionally an inner polymeric sheath (not shown), e.g. of MDPE or HDPE, can be disposed between the water blocking layer and the layer of polymeric yarns.

A tubular element according to the invention, for instance a buffer tube 10 or a tube 20 as shown above, thus comprises, or preferably is defined by, a sheath housing at least one optical fiber therein, said polymeric sheath being made from a polymeric composition comprising a heterophasic olefin copolymer having an amorphous phase and at least two different crystalline phases as previously defined and as illustrated in detail hereinafter.

The presence and amount of crystalline phases in the heterophasic copolymer can be determined by means of DSC analysis according to the standard analysis methods.

The amount of the amorphous phase can be determined by difference between the total weight of polymer and the weight of the crystalline phases, as determined for instance by the DSC analysis.

The presence of a crystalline phase can alternatively be ascertained by other analysis, for example by X-ray diffractometry. The presence of the typical reflection of crystalline cells at the characteristic angles indicates the presence of a corresponding crystalline phase in the heterophasic copolymer, which can also be quantified according to this technique. For instance, typical reflection angles are $2\theta=21.5°$ and $23.3°$ for crystalline polyethylene and $2\theta=14.1°$ and $16.9°$ for isotactic crystalline polypropylene alpha-phase (see e.g. Macromolecular Chem. 75 134 (1964), Jones T. et al, and 23 4114 (1990) for details on diffractometric peaks of PP alpha- and gamma-phase, respectively).

The at least first and second crystalline phases in the heterophasic copolymer give rise to two groups of distinct crystalline cells which can be detected according to at least one of the above analytical methods. For instance, the presence of these two different groups of crystalline cells can be either detected through the above mentioned DSC analysis, where the two crystalline phases show two different melting peaks corresponding to the respective melting temperatures, or, in case of the two crystalline phases having similar melting temperatures (thus possibly giving rise to a peak overlapping in the DSC diagram), by means of the X-ray diffractometry, where the crystalline phases can be distinguished through their respective characteristic reflection angles.

Examples of different crystalline phases are, for instance, crystalline phases from substantially homopolymeric sequences of different α-olefins, such as ethylene, propylene or 1-butene.

In order to allow a suitable processability of the polymeric material and to confer the desired flexibility to the buffer tube, the amount of the amorphous phase is of at least about 50 percent of the total weight of the heterophasic copolymer. However, the amount of said amorphous phase is preferably lower than about 90 percent of the total weight of polymer, in order, for instance, to confer the desired processability to the material. Preferred amounts of said amorphous phase may be from about 60% to about 90% of the total weight of heterophasic copolymer, more preferably from about 65% to about 85%.

For allowing an effective interaction between the at least two different crystalline phases, it has been observed that the amount of each of the at least two crystalline phases should preferably be of at least about 2 percent of the total weight of the polymer. More preferably, each of the at least two crystalline phases is present in an amount of at least 5 percent of the total weight, up to an amount of e.g. about 25%.

The total amount of crystalline phases, i.e. the sum of the different crystalline phases present into the etherophasic polymer, is preferably of about 50 percent or less, more preferably of about 40 percent or less, of the total weight of the polymer, in order not to excessively increase the stiffness of the buffer tube. Said total amount of crystalline phase preferably represents at least about 15 percent of the total weight of the etherophasic polymer, more preferably at least 18 percent. According to a preferred embodiment, said total amount of crystalline phase is from about 20% to about 30% of the total weight of the heterophasic polymer.

Preferably, the relative ratio by weight between the first and the second crystalline phase is from about 1:2 to about 7:1, more preferably from 2:3 to about 3:1.

If desired, the relative amount of a crystalline phase comprised in said copolymer can be increased by separately adding to the heterophasic copolymer, for instance by mechanically mixing with it, a certain amount of a second polymer including said crystalline phase. For instance, an at least partial crystalline homopolymer, corresponding to the homopolymer forming the crystalline phase of the heterophasic copolymer to be increased, can be added.

The heterophasic olefin copolymers is obtainable from the copolymerisation of at least two different olefin monomers, said olefin monomer comprising from 2 to 12 carbon atoms, preferably with the instauration on the alpha carbon. Preferably, said olefin monomer is a compound of formula $CH_2=CH-R$, wherein R is hydrogen or a linear or branched alkyl containing from 1 to 10 carbon atoms. Examples of suitable olefins are, for instance, ethylene, propylene, 1-butene, 1-pentene, 1-hexene, 4-methyl-1-pentene, 1-octene, 1-dodecene and the like.

For instance, an ethylene-propylene copolymer can be employed, which comprises homopolymerized sequences of propylene defining a first crystalline phase, homopolymerized sequences of ethylene defining a second crystalline phase and an ethylene-propylene copolymerised sequences defining the amorphous phase. Preferably the etherophasic polymeric material suitable for manufacturing buffer tubes or protective sheaths according to the invention is an ethylene-propylene copolymer, optionally comprising an α-olefin different from polypropylene and, further optionally, small amounts of a diene monomer.

By way of example, an heterophasic polymer suitable for manufacturing a buffer tube according to the invention may comprise from about 60% to about 75% of its total weight of an amorphous phase (e.g. EPR), from about 5% to about 25% of a first crystalline phase (e.g. of homopolymerized propylene sequences) and from about 5% to about 25% of a second crystalline phase (e.g. of homopolymerized ethylene sequences), the total amount of the crystalline phases being less than about 40% by weight.

The crystalline phases of the heterophasic copolymer preferably have a melting point higher than about 100° C., more preferably higher than about 110° C.

The substantial absence of crystalline phases melting at a temperature below 100° C., preferably below 110° C., substantially reduces the risk of partial melting of the polymeric material during subsequent manufacturing steps, e.g. when an outer polymeric sheath has to be extruded around a polymeric tubular element according to the invention.

Preferably, at least said first crystalline phase has a melting point of at least 140° C. or higher, preferably of at least 150° C. or higher. In this manner, the thermal stability of the polymeric material can be further increased, thus further preventing the material to partially melt when an outer polymeric sheath is extruded at higher temperatures around a component comprising said Polymeric material.

Suitable heterophasic olefin copolymers can be obtained by sequential copolymerization of:
(a) an α-olefin monomer (e.g. propylene), optionally containing small amounts of a different olefin comonomer (e.g. ethylene); and then of:
(b) a mixture of an olefin monomer, equal or different from the olefin comonomer of step (a), with an α-olefin monomer (e.g. propylene) and, optionally, with small amounts of a diene.

The term olefin is referred either to ethylene or to an α-olefin. The term "α-olefin" means an olefin of formula $CH_2=CH-R$, wherein R is a linear or branched alkyl containing from 1 to 10 carbon atoms. The α-olefin can be selected, for example, from: propylene, 1-butene, 1-pentene, 4-methyl-1-pentene, 1-hexene, 1-octene, 1-dodecene and the like.

The diene optionally present as comonomer generally contains from 4 to 20 carbon atoms and is preferably selected from: linear, conjugated or non-conjugated diolefins, for example 1,3-butadiene, 1,4-hexadiene, 1,6-octadiene and the like; monocyclic or polycyclic dienes, for example 1,4-cyclohexadiene, 5-ethylidene-2-norbornene, 5-methylene-2-norbornene and the like. The composition of the amorphous phase is generally as follows: from 15 to 85 mol % of ethylene, from 15 to 85 mol % of α-olefin, from 0 to 5 mol % of a diene.

Similarly, the preferred heterophasic ethylene-propylene copolymers can be obtained by sequential copolymerization of:
(a) propylene, optionally containing small amounts of at least one olefin comonomer selected from ethylene and α-olefins other than propylene; and then of:
(b) a mixture of ethylene with an α-olefin, in particular propylene and, optionally, with small amounts of a diene.

This class of products is also commonly referred to as "thermoplastic reactor elastomers".

The preparation of the said heterophasic copolymers is usually carried out by copolymerization of the corresponding monomers in the presence of Ziegler-Natta catalysts based on halogenated titanium compounds supported on magnesium chloride. Details regarding the preparation of these copolymers are given, for example, in European Patent no. 400 333.

With reference to the preparation of an ethylene-propylene heterophasic copolymer, during the above mentioned step (a) of the process, a crystalline (thermoplastic) phase is produced consisting of a propylene homopolymer or a crystalline copolymer of propylene with an olefin comonomer selected from ethylene and α-olefins other than propylene. The olefin comonomer is preferably ethylene. The amount of olefin comonomer introduced in this first step is preferably less than 10 mol % relative to the total number of moles of the thermoplastic phase, in order not to negatively affect the formation of the crystalline phase.

Said thermoplastic phase comprises propylene homopolymers or copolymers with relatively high isotactic indexes (typically higher than about 90 for the homopolymer and higher than about 85 for the copolymers), thus resulting in the desired first crystalline phase of the heterophasic polymer.

The amorphous phase of the heterophase olefin copolymer, mainly produced during the above mentioned step (b) of the process, is preferably at least 50% by weight, more preferably at least 60% by weight, and even more preferably at least 65% by weight, relative to the total weight of the heterophase copolymer, and consists of an elastomeric copolymer of ethylene with an $\alpha$-olefin as above defined, and optionally with a diene as above defined. The said $\alpha$-olefin is preferably propylene. The diene optionally present is preferably 1,3-butadiene. The composition of the amorphous phase is generally as follows: from 15 to 85 mol % of ethylene, from 15 to 85 mol % of $\alpha$-olefin, from 0 to 5 mol % of a diene.

During said second step (b) of the process, a second crystalline phase, deriving essentially from homopolymerized ethylene sequences, is also produced. The amount of said second crystalline phase depends from the relative amount of ethylene present in the mixture of ethylene and $\alpha$-olefin which is introduced during said step (b) of the process. In general, if the relative amount of ethylene is less than about 40% of the total weight of the mixture, the amount of the crystalline phase from ethylene homopolymerized fractions in the final heterophasic copolymer will be negligible. In order to have an effective amount of crystalline phase from homopolymerized ethylene sequences in the final heterophasic copolymer, the amount of ethylene in said mixture will thus be of at least 40%, preferably from about 45% to about 75% of the total weight of the mixture. In a preferred embodiment, the mixture employed in said step (b) of the process is thus rich in ethylene units, the amount of ethylene units being preferably from 40% to 80% by weight, more preferably from 45 to 75% by weight relative to the total weight of the mixture reacting during said step (b).

The amount of crystalline polypropylene in the final copolymer is preferably less than about 20% by weight the total weight of the copolymer, preferably from about 10% to about 18%, in order to avoid an excessive stiffness of the extruded component. On the other side, for conferring the desirable easy-tear properties, the amount of crystalline polyethylene is preferably of at least 2% the total weight of the copolymer, more preferably from about 5% to about 12%.

As previously mentioned, the amount of one of the two crystalline phases, in particular the one deriving from homopolymerized ethylene sequences, can be increased by mechanically mixing a certain amount of a respective partial crystalline homopolymer with the heterophasic copolymer. For instance a partial crystalline linear low density polyethylene can be added to a heterophasic ethylene-propylene copolymer (e.g. in a weight amount of from about 50% to about 120% with respect to the amount of copolymer), for increasing the amount of the crystalline PE phase.

Heterophasic olefin copolymers with two different crystalline phases (in particular crystalline PP and PE) suitable for manufacturing a telecommunication cable component according to the present invention can be found on the market among the large class of so-called "polypropylene reactor mixtures" sold, for example, by Basell under the brand name Hifax®.

Although not willing to be bound to any particular theory, the Applicant is of the opinion that the presence of the two crystalline phase dispersed into the amorphous matrix of the heterophasic copolymer confers particular advantages to the polymeric material forming a tubular elements according to the invention. For instance, the simultaneous presence of the two crystalline phases, as compared with heterophasic copolymers having a single crystalline phase, confer improved "easy-tear" properties to a component comprising said polymer, probably because of a relative incompatibility between the two different crystalline phases. On the other side, it is believed that the "in situ" formation of both the crystalline phases within the heterophasic copolymer allows to obtain a better compatibilization of the crystalline phases within the amorphous phase. This better compatibilization may result, for instance, in optimal processability properties of the material. In addition, substantial amounts of inorganic fillers can be incorporated in the polymeric material without undesirably impairing the mechanical properties of the polymeric composition, in particular avoiding undesirable breakage of the sheath during tearing operations.

As previously mentioned, the amount of a crystalline phase can be determined by means of DSC analysis. For instance a DSC instrumentation from Mettler-Toledo can be used, comprising a DSC 30 instrument, a PC11 type processor and Graphware TA72AT.1 software. The polymer is first heated above its melting temperature (e.g. about 200° C. for ethylene-propylene copolymers), in order to remove its thermal history; then, it is slowly cooled at 10° C. and heated again above its melting temperature with a scan rate of 10° C./min. The area generated by each melting peak in the resulting thermogram is then integrated and the enthalpy of fusion of each peak (corresponding to a respective crystalline phase) is thus calculated. The amount of each crystalline phase is determined (as weight percentage of the whole polymer) by dividing the enthalpy of fusion measured for the corresponding melting peak by the reference enthalpy of fusion of the respective theoretically 100% crystalline polymer. For instance, the reference enthalpy of fusion of a theoretically 100% crystalline polyethylene is 290 J/g, while for a theoretically 100% crystalline polypropylene is 190 J/g.

Methods of calculation of the polymer crystallinity and reference values for the theoretically 100% crystalline polymers can be found on a number of reference books and operating manuals of DSC instruments such as, for instance, the application bulletin of Mettler-Toledo GmbH, "Collected Applications, Thermal Analysis, Thermoplastics, March 1997".

Inorganic fillers are preferably added to the polymeric composition, in order to suitably modify the mechanical properties of the polymeric material, in particular for reducing the elongation to break of the polymeric material, thus further improving the manual tearing of the polymeric component. The addition of inorganic filler, particularly in amounts equal to or higher than about 50% by weight with respect to the total weight of the polymeric composition, may also confer advantageous flame retardant properties to the polymeric composition.

Inorganic fillers which can generally be used are hydroxides, hydrated oxides, salts or hydrated salts of metals, in particular of calcium, magnesium, or aluminum, also in admixture with other inorganic fillers such as silicates. Examples of suitable inorganic fillers are magnesium hydroxide (including natural magnesium hydroxide, e.g. from the milled brucite mineral), aluminium hydroxide, aluminum oxide (including kaoline, i.e. an hydrated aluminum silicate), alumina trihydrate, magnesium carbonate hydrate, magnesium carbonate, magnesium calcium carbonate hydrate, magnesium calcium carbonate, or mixtures thereof. Magnesium hydroxide, aluminum hydroxide and alumina trihydrate ($Al_2O_3.3H_2O$) and mixtures thereof are particularly preferred. Minor amounts, generally less than 25% by weight, of one or more inorganic oxides or salts such as CoO, $TiO_2$, $Sb_2O_3$, ZnO, $Fe_2O_3$, $CaCO_3$ or mixtures thereof, can advantageously be added to these compounds. The above mentioned metal hydroxides, in particular the magnesium and aluminum hydroxides, are preferably used in the form of particles with sizes which can range between 0.1 and 20 μm, preferably between 0.5 and 10 μm.

The inorganic fillers can be used advantageously in the form of coated particles. Coating materials preferably used are saturated or unsaturated fatty acids containing from 8 to 24 carbon atoms, and metal salts thereof, such as, for example: oleic acid, palmitic acid, stearic acid, isostearic acid, lauric acid; magnesium or zinc stearate or oleate; and the like.

The amount of inorganic filler is preferably from about 40% to about 90% of the total weight of the polymeric composition, more preferably from about 50% to about 85%, even more preferably from about 60% to about 80%.

If desired, small amounts of a coupling agent can also be added to the mixture in order to enhance the compatibility between the inorganic filler and the polymer material The amount of coupling agent to be added to the mixture can vary mainly as a function of the type of coupling agent used and the amount of flame-retardant filler added. However, in order not to negatively affect the processability of the polymeric composition, the amount of coupling agent, when present, is generally kept below 5% by weight relative to the total weight of the base polymer mixture, preferably from 0.01 to 3%, and even more preferably from 0.02 to 1%

Said coupling agent is selected, for example, from saturated silane compounds or silane compounds containing at least one ethylenic unsaturation; epoxides containing an ethylenic unsaturation; organic titanates; mono- or dicarboxylic acids containing at least one ethylenic unsaturation, or derivatives thereof such as, for example, anhydrides or esters.

The compositions preferably contains antioxidant additives, preferably selected among polymerized trimethyidihydroquinoline, 4,4'-thiobis(3-methyl-6-tert-butyl)phenol; pentaerythrityltetrakis[3-(3,5-di-tert-butyl-4-hydroxyphenyl) propionate], 2,2'-thiodiethylenebis[3-(3,5-di-tert-butyl-4-hydroxyphenyl) propionate] and the like, or mixtures thereof.

Other conventional components, such as processing coadjuvants, lubricants, pigments, other fillers and the like, can be added to the polymeric compositions according to the present invention.

Processing coadjuvants usually added to the polymer composition are, for example, calcium stearate, zinc stearate, stearic acid, paraffin wax, silicone rubbers and the like, or mixtures thereof.

The polymeric composition can be prepared by mixing the polymer component(s), the filler and the additives according to techniques known in the art. The mixing can be carried out, for example, using an internal mixer of the type with tangential rotors (Banbury) or with interpenetrating rotors, or alternatively in continuous mixers such as Ko-Kneader (Buss) or co-rotating or counter-rotating twin-screw mixers.

The composition can thus be applied as a tubular element as known in the art, for instance it can be extruded in the form of a buffer tube housing optical fibers.

The polymeric composition forming the tubular element should preferably have a reduced elongation at break in order to allow the installer to easily manually tear the element, e.g. without the risk of straining the optical fibers housed therein. Accordingly, said polymeric material should preferably have an elongation at break lower than about 500%, more preferably below about 400%, down to e.g. about 100%. However, the easy tearing of the material should not result in the material being broken into pieces of short length when trying to tear the element; rather, it is preferred that once the tear of the sheath has begun (e.g. when an initial portion of a buffer tube has been pinched and separated in two different parts), the polymeric sheath is removed with a single operation as a single strip of material, in a length of e.g. at least 10 cm.

A buffer tube according to the invention, made from a polymeric composition as above described, can thus be easily manually removed by an operator for gaining access to the optical fibers housed therein. In particular, the above polymeric composition allows an easy manual removal of the polymeric sheath not only at the respective ends of the buffer tube, but also at any intermediate location of the buffer tube (i.e. the so-called mid-span access).

Although the use of the above polymeric composition has been illustrated with specific reference to the manufacturing of buffer tubes apt to house at least one optical fiber within it, in particular having relatively thin containment wall, it may be understood that said polymeric composition can be used for manufacturing any polymeric tubular element, such as tubes or sheaths, in any kind of optical cable, which need to be easily removed by manual tearing. In particular, it can be appreciated that the present invention is directed to any tube or sheath made from said polymeric composition, and to any cable comprising said tube or sheath, whichever the dimensions of the tube or sheath and whichever the disposal of the tube or sheath within the cable structure.

The following examples are given for better illustrating the invention.

EXAMPLES

Example 1

Polymeric Materials

Figure 5:
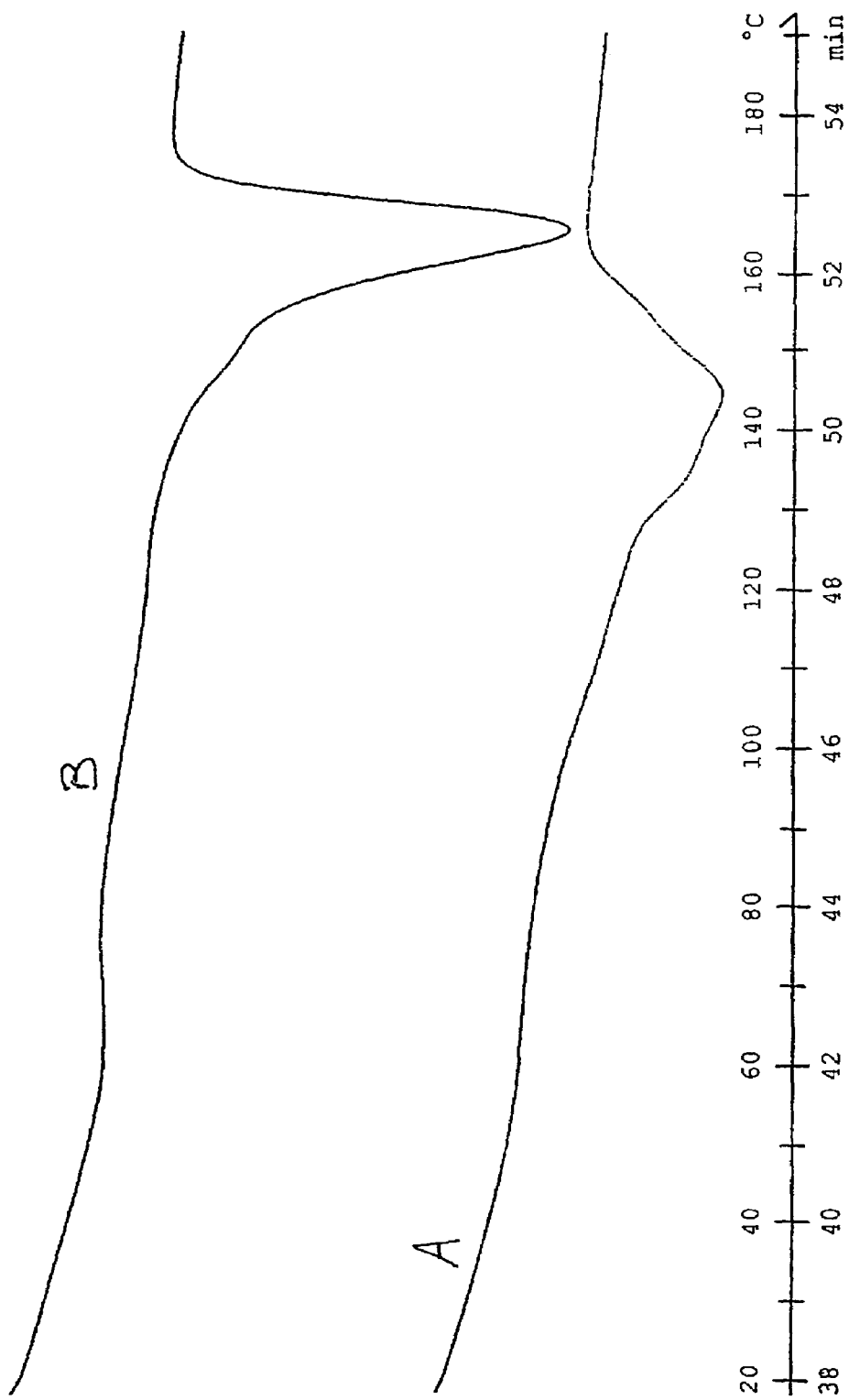
FIGS. 5–8 show the DSC diagrams of some polymers.
Figure 6:
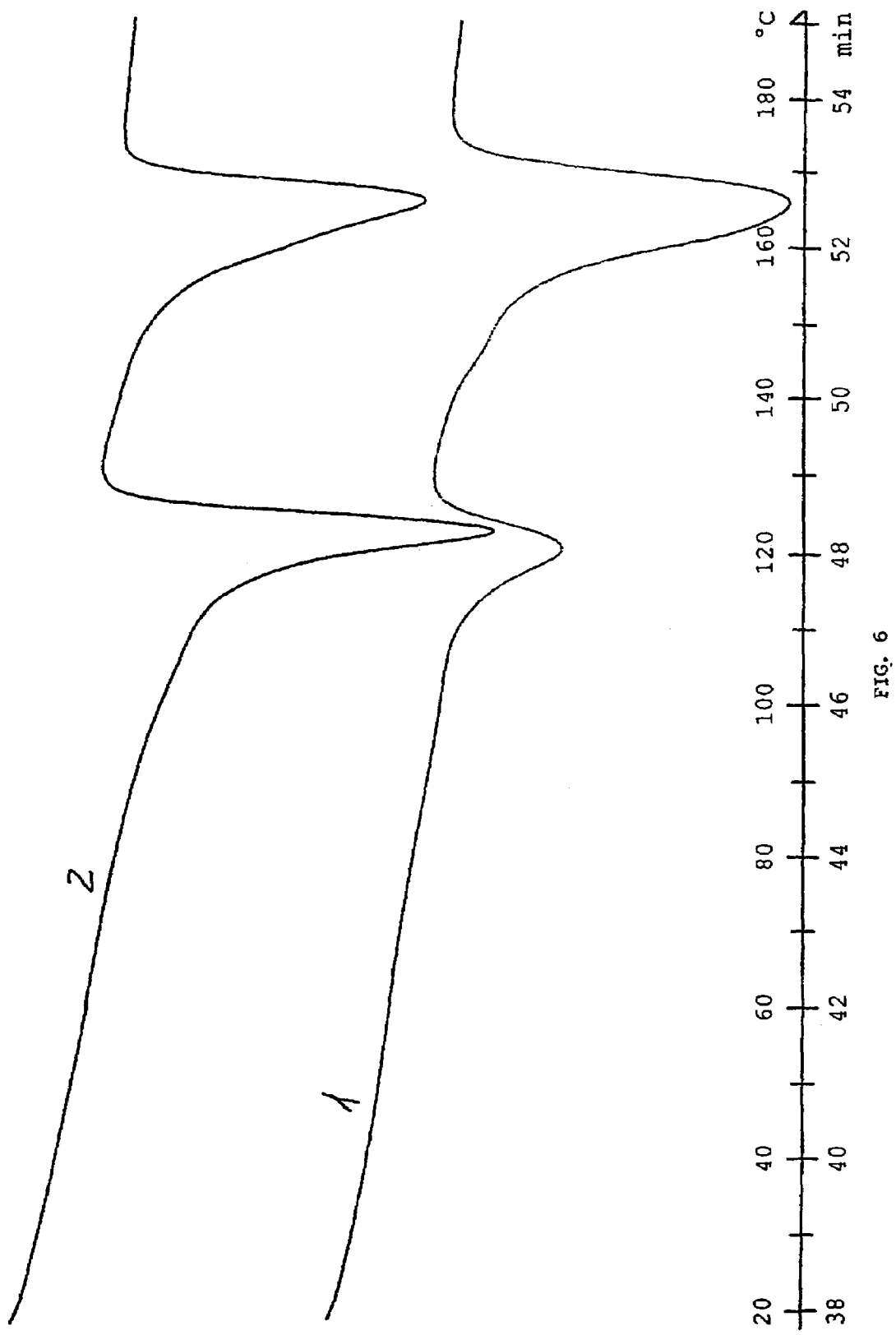
Figure 7:
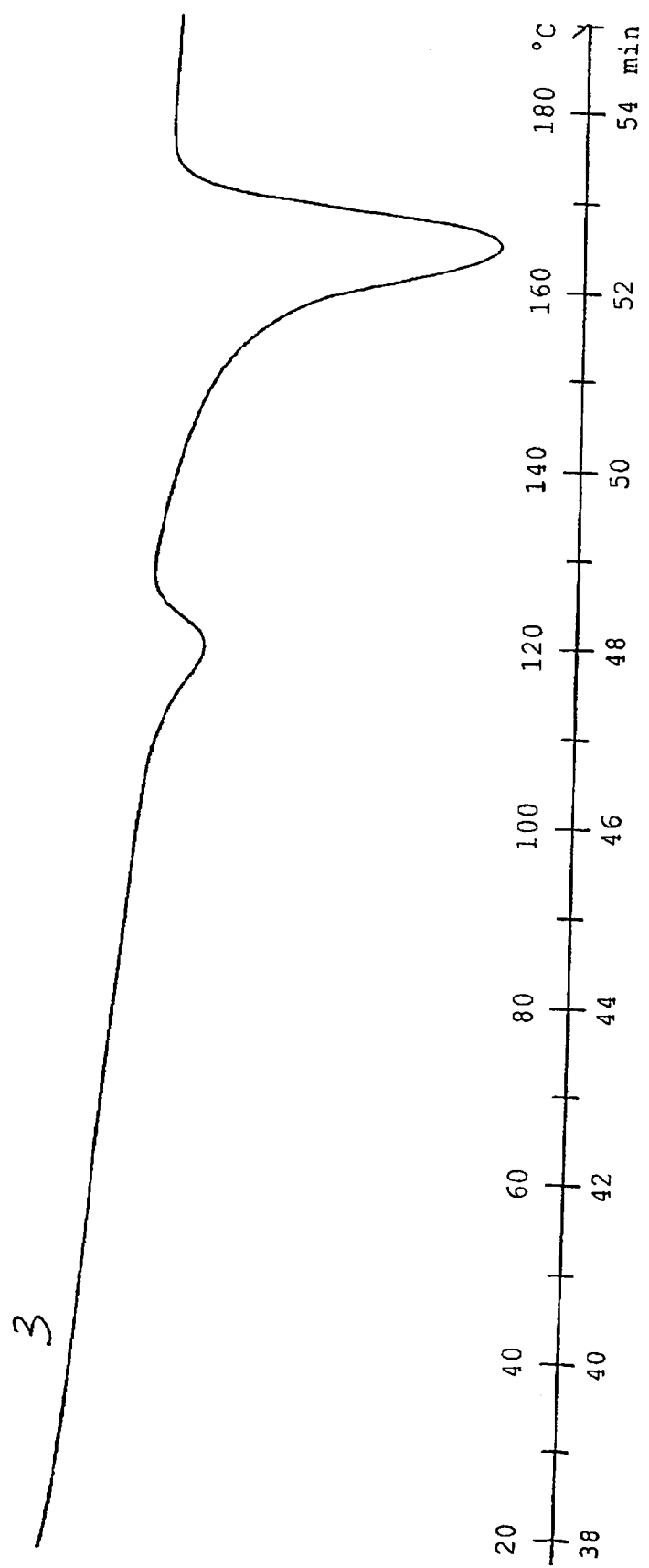
Figure 8:
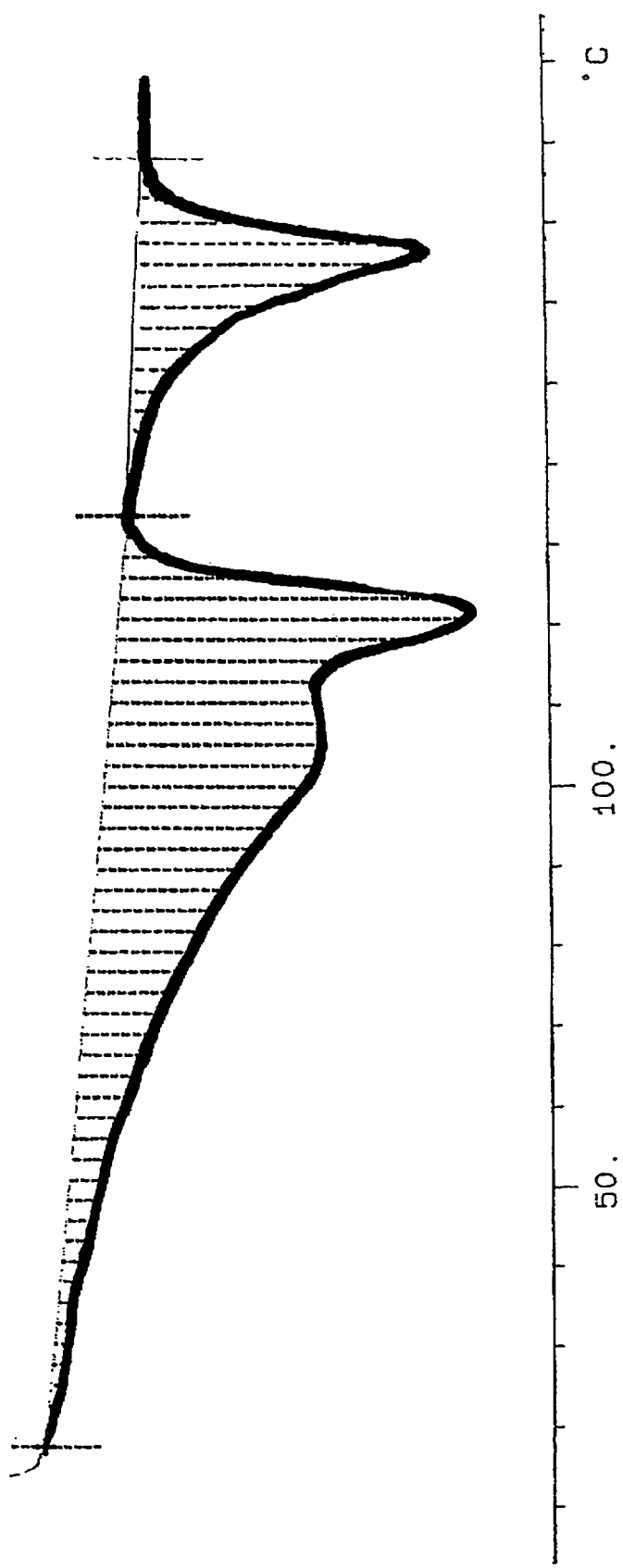

The following polymers, copolymers or polymeric mixtures have been employed:

Cop. A (Hifax CA10A, Basell): ethylene-propylene etherophasic copolymer comprising an amorphous phase of EPR and a single crystalline phase of PP;

Cop. B (Hifax KS081, Basell): ethylene-propylene etherophasic copolymer comprising an amorphous phase of EPR and a single crystalline phase of PP;

Cop. 1 (Hifax 7320, Basell): ethylene-propylene etherophasic copolymer comprising an amorphous phase of EPR, a crystalline phase of PP and a crystalline phase of PE;

Cop. 2: ethylene-propylene etherophasic copolymer comprising an amorphous phase of EPR, a crystalline phase of PP and a crystalline phase of PE;

Cop. 3 (Hifax CA12A, Basell): ethylene-propylene etherophasic copolymer comprising an amorphous phase of EPR, a crystalline phase of PP and a crystalline phase of PE;

PE 1 (Flexirene CL 10, Polimeri Europa): partial crystalline linear polyethylene;

MIX 1: a 1:1 (w/w) mechanical mixture of Cop. 3 and PE 1;

The crystallinity of the above polymeric materials has been determined by using a DSC instrumentation from Mettler (comprising a DSC 30 instrument, a PC11 type processor and Graphware TA72AT.1 software) according to the methodology previously illustrated. FIGS. 5 and 6 show the relevant DSC diagrams for some of the above materials. In particular, FIG. 5 shows the DSC diagrams of Cop. A and cop. B (lines A and B, respectively) and FIG. 6 shows the DSC diagrams of Cop. 1 and Cop. 2 (lines 1 and 2, respectively); FIG. 7 shows the DSC diagrams of Cop. 3 (line 3) and FIG. 8 of the polymeric mixture Mix 2. FIG. 8 further shows the exemplified integration of the peaks. For the sake of clarity, only the temperature axis has been reported on the diagrams.

The following table 1 shows the relevant amounts of crystalline phases calculated for each of the above polymeric materials:

TABLE 1

DSC Analysis

| | Crystalline PP (weight %) | Crystalline PE (weight %) | Total crystallinity (weight %) | PP/PE Ratio |
|---|---|---|---|---|
| Cop. A (*) | 12 | — | 12 | |
| Cop. B (*) | 16 | — | 16 | |
| Cop. 1 | 13 | 8.4 | 21.4 | 1.6 |
| Cop. 2 | 11 | 11 | 22 | 1.0 |
| Cop. 3 | 17.8 | 2.6 | 20.3 | 6.8 |
| Mix | 8.4 | 21 | 29.3 | 0.4 |

(*) comparative

As shown in the above table and from the DSC diagrams, it is apparent that polymeric materials Cop.A and Cop.B have a single crystalline phase (i.e. PP, corresponding to the single melting peak of the diagram), while the remainder or the tested polymeric materials show the presence of two different crystalline phases, with a total amount of 20–30% of crystalline phase. In addition, from the DSC diagrams of FIGS. 6 and 7, it is also apparent that the second crystalline phase (PP) has a melting point higher than 150° C.

From the DSC diagrams, it can also be observed that some melting peaks of the crystalline phases are relatively narrower with respect to other which are broader (e.g. the PE melting peaks of Cop. 1 and Cop. 2, the PE melting peak of Mix or the single PP melting of Cop. A). The more or less pronounced "tails" below the maximum temperature of the crystalline PE or crystalline PP melting peaks are attributable to phases having lower crystallinity, presumably consisting of shorter sequences of ethylene or propylene units, respectively, capable of developing only limited crystallinity.

The crystallinity of some of the above materials has also been determined by means of X-ray diffratometric analysis, using a Philips diffractometer for powders, with Ni filtered Ka radiation of Cu, scanning rate 0.05°, in the 2θ range from 4° to 40°. Due to the different analytical method, increased values for each crystalline phase have been determined. Apart this increase in the calculated percentages of crystallinity, the results of the X-ray diffrattometric analysis are similar to the results of the DSC analysis, confirming the presence in the tested materials of a single crystalline phase (Cop. A. and Cop. B) or of two crystalline phases (Cop. 2, Cop. 3 and Mix), with similar relative weight ratios.

TABLE 2

X-ray Diffrattometric Analysis

| | Crystalline PP (weight %) | Crystalline PE (weight %) | Total crystallinity (weight %) |
|---|---|---|---|
| Cop. A (*) | 26 | — | 26 |
| Cop. B (*) | 29 | — | 29 |
| Cop. 2 | 12 | 17 | 29 |
| Cop. 3 | 21 | 5.6 | 26.6 |
| Mix | 10 | 25 | 35 |

The granules of the polymeric materials shown in table 1 have been pressed at 190° C. with 10–15' pre-heating, to obtain 1 mm thickness specimens, which have been tested according to standard CEI 20-11 Par. B4 for determining the respective tear strength. The results are reported in table 3.

TABLE 3

Tear Test on polymeric materials

| | Cop. A | Cop. B | Cop. 1 | Cop. 2 | Cop 3 | Mix |
|---|---|---|---|---|---|---|
| Tear strength (N/mm$^2$) | 19.1 | 17.6 | 9.8 | 11.8 | 8.2 | 12 |

As shown from the above table 3, polymeric etherophasic materials with two crystalline phases show a reduced tear strength with respect to those having a single crystalline phase.

Example 2

Polymeric Compositions and Properties

The polymeric materials of table 1 has been used for preparing eight polymeric compositions to be tested.

The compositions have been prepared by mixing the components as shown in table 4, in a 8 liter Werner type closed mixer, having a volumetric packing ratio of about 0.74, with a water degassing cycle of 2' and subsequent addition of calcium oxide, where required by the formulation.

The mixture is then granulated and stocked in plastic bags for subsequent use.

The following additives, in the amounts indicated in table 3, have been used:

Hydrofy GS 1.5 (Sima): magnesium hydroxide coated with stearic acid;

Kezadol GR (Kettliz): calcium oxide elastomeric masterbatch, dehydrating agent;

Rhodorsil MF175U (Rhone Poulenc): silicon rubber, process adjuvant, lubricating agent;

Millad 3988 (Milliken Chemicals): 3,4-di(methylbenzylidene) sorbitol, organic nucleating agent;

Irganox PS 802 and Irganox®1010 (Ciba Geigy): antioxidants;

Atomfor S (Omya): calcium carbonate coated with stearic acid;

The following table 3 shows the formulation for each of the eight polymeric compositions to be tested (amounts are in weight's parts).

TABLE 4

Polymeric compositions

| | Test A (*) | Test B (*) | Test C (*) | Test 1 | Test 2 | Test 3 | Test 4 |
|---|---|---|---|---|---|---|---|
| Cop. A | 100 | | 100 | | | | |
| Cop. B | | 100 | | | | | |
| Cop. 1 | | | | 100 | | | |
| Cop. 2 | | | | | | 100 | 100 |
| Cop. 3 | | | | | 50 | | |
| PE1 | | | | | 50 | | |
| Hydrofy GS1.5 | 220 | 220 | 180 | 220 | 220 | 220 | |
| Atomfor S | | | | | | | 260 |
| Kezadol GR | 5 | 5 | 5 | 5 | 5 | 5 | |
| Rhodorsil MF175U | | | 0.5 | | | | |
| Millad 3988 | | | | 0.3 | | 0.3 | 0.3 |
| Irganox PS 802 | 0.2 | 0.2 | 0.2 | 0.2 | 0.2 | 0.2 | |
| Irganox 1010 | 0.1 | 0.1. | 0.1 | 0.1 | 0.1 | 0.1 | |

(*) comparative

The granules of the polymeric compositions prepared as above have been pressed at 190° C. with 10–15' pre-heating, to obtain 1 mm thickness specimens, which have been tested according to standard CEI 20-11 Par. B4 for determining the respective tear strength. The results are reported in table 5.

TABLE 5

Tear Test on polymeric compositions

| | Test A | Test B | Test C | Test 1 | Test 2 | Test 3 | Test 4 |
|---|---|---|---|---|---|---|---|
| Tear strength (N/mm²) | 9.4 | 10.1 | 11 | 5.8 | 7.4 | 7 | 6.4 |

As shown from the above tables 5, polymeric compositions comprising heterophasic materials with two crystalline phases show an improved tearing with respect to those having a single crystalline phase.

Example 4

Preparation of Buffer Tubes and Tear Test

The granules of the polymeric compositions prepared according to example 2 have been used for manufacturing buffer tubes containing twelve optical fibers (250 micron diameter each), said tubes having an outer diameter of about 1.4 mm and a thickness of about 0.12 mm, by using a tubing die with a draw down ratio of about 2. The line speed was set at about 50 m/min, the temperature of the polymeric composition at the exit from the extruder was of about 220° C. and the temperature of cooling water was about 20° C.

The buffer tubes have then been tested for measuring the elongation at break and tear properties of the extruded composition under simulated installation conditions.

All the tested compositions 1 to 4 show elongation at break values lower than about 500%, according to CEI standard 20-34, par. 5.1.

Figure 9:
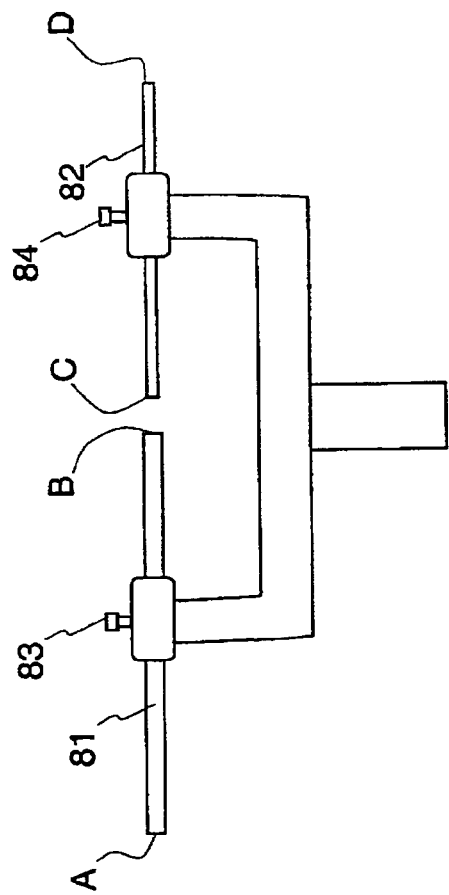
FIG. 9 shows an apparatus for testing the tear properties of buffer tubes.

For the tear test, a tube of 300 mm length has been disposed into a device as shown in FIG. 9. Said device comprises a first steel tube 81 having a diameter slightly larger than the buffer tube (about 2 mm) and a second steel tube 82 having a diameter slightly larger than the one of the bundle of optical fibers (about 1.5 mm), both steel tubes having a length of about 100 mm. The buffer tube is first inserted into the first steel tube 81 through opening A and pulled out through opening B. Afterward, the polymeric sheath of the buffer tube is torn and the exposed bundle of fibers is inserted into steel tube 82 from opening C and pulled out through opening D. The distance between openings C and D is adjusted at about 7–8 mm and the tubes are then blocked by means of screws 83 and 84. The device is then positioned into a dynamometer (e.g. INSTRON mod. 4502) and a length of about 4–5 cm of the torn polymeric sheath (left between openings C and D) is then inserted into a clamp, connected to a load cell, which is moved vertically upwardly at a speed of 15 mm/min. When the clamp begins to move, the sheath is torn and, while the tearing of the sheath proceeds, the buffer tube and the bundle of fibers (because of the short distance between openings C and D) are forced to move through respective steel tubes 81 and 82, from opening A towards opening D. A continuous length of at least 10 cm of the sheath should be torn, without breakage of the sheath.

The results of the test are reported in the following table 6. The table shows the initial tear force, i.e. the peak force measured by the dynamometer for the initial tear of the polymeric sheath, and the "equilibrium tear force" force, i.e. the force measured by the dynamometer during the tearing of the polymeric sheath after the peak of the initial tear.

TABLE 6

Tear test results

| Tear force (g) (Min–max value) | Test A | Test C | Test 1 | Test 3 |
|---|---|---|---|---|
| Initial | 300–340 | 360–420 | 240–260 | 280–290 |
| Equilibrium | 290–300 | 330–390 | 235–250 | 260–275 |

As shown by the above table, buffer tubes according to the invention show a reduced tearing force with respect to buffer tubes made from etherophasic polymers comprising a single crystalline phase. The buffer tubes of tests 1 and 3 has been stripped for length longer than 10 cm without breakage of the polymeric sheath.

What is claimed is:

1. A telecommunication cable comprising a tubular element of polymeric material and at least one transmission element housed within said tubular element, wherein said polymeric material is made from a polymeric composition comprising a heterophasic olefin copolymer which comprises:
   a) at least one amorphous phase comprising sequences deriving from copolymerisation of at least two different olefin monomers;
   b) at least a first crystalline phase comprising sequences deriving from homopolymerization of a first olefin monomer; and
   c) at least a second crystalline phase comprising sequences deriving from homopolymerization of a second olefin monomer.

2. The telecommunication cable according to claim 1, wherein said at least two different monomers of the amorphous phase are the first and the second monomer of the first and second crystalline phase, respectively.

3. The telecommunication cable according to claim 1, wherein each of said olefin monomers of the amorphous phase and of said first and second crystalline phase is independently selected from an olefin comprising from 2 to 12 carbon atoms and an unsaturation on the alpha carbon.

4. The telecommunication cable according to claim 3, wherein said olefin is a compound of formula $CH_2=CH-R$, wherein R is hydrogen or a linear or branched alkyl containing from 1 to 10 carbon atoms.

5. The telecommunication cable according to claim 3, wherein said olefin is selected from the group consisting of ethylene, propylene, 1-butene, 1-pentene, 1-hexene, 4-methyl-1-pentene, 1-octene and 1-dodecene.

6. The telecommunication cable according to claim 1, wherein said first and second crystalline phases have a melting point higher than about 100° C.

7. The telecommunication cable according to claim 1, wherein said first and second crystalline phases have a melting point higher than about 110° C.

8. The telecommunication cable according to claim 1, wherein said first crystalline phases have a melting point of at least 140° C. or higher.

9. The telecommunication cable according to claim 1, wherein said first crystalline phases have a melting point of at least 150° C. or higher.

10. The telecommunication cable according to claim 1, wherein the amount of the amorphous phase is from about 50 percent to about 90 percent of the total weight of the heterophasic copolymer.

11. The telecommunication cable according to claim 1, wherein the amount of the amorphous phase is from about 60 percent to about 90 percent of the total weight of heterophasic copolymer.

12. The telecommunication cable component according to claim 1, wherein the amount of the amorphous phase is from about 65 percent to about 85 percent of the total weight of the heterophasic copolymer.

13. The telecommunication cable according to claim 1, wherein the amount of each of said first and second crystalline phases is at least about 2 percent of the total weight of the polymer.

14. The telecommunication cable according to claim 1, wherein the amount of any of the at least two crystalline phases comprised in the heterophasic copolymer is from about 5 percent to about 25 percent of the relative ratio of the total weight of the polymer.

15. The telecommunication cable according to claim 1, wherein the relative ratio by weight between said first and said second crystalline phases is from about 1:2 to about 7:1.

16. The telecommunication cable according to claim 1, wherein the relative ratio by weight between said first and said second crystalline phases is from 2:3 to about 3:1.

17. The telecommunication cable according to claim 1, wherein said heterophasic copolymer is an ethylene-propylene based copolymer, comprising a crystalline phase of polypropylene homopolymer and a crystalline phase of polyethylene homopolymer.

18. The telecommunication cable according to claim 17, wherein said ethylene-propylene based copolymer further comprises an $\alpha$-olefin co-monomer.

19. The telecommunication cable according to claim 17, wherein said ethylene-propylene based copolymer further comprises a diene co-monomer.

20. The telecommunication cable according to claim 1, wherein said polymeric composition further comprises a homopolymer of said first or second olefin monomer having a crystalline phase comprising sequences deriving from the homopolymerization of said respective first or second monomer.

21. The telecommunication cable according to claim 20, wherein the amount of crystalline phase in said homopolymer is from about 20% to about 50% of the total weight of homopolymer.

22. The telecommunication cable according to claim 20, wherein the weight radio between said homopolymer and said heterophasic copolymer is from about 1:2 to about 1:1.

23. The telecommunication cable according to claim 1, wherein said polymeric composition further comprises an inorganic filler dispersed therein.

24. The telecommunication cable according to claim 23, wherein the amount of inorganic filler is from about 40% to about 90% of the total weight of the polymeric composition.

25. The telecommunication cable according to claim 23, wherein the amount of inorganic filler is from about 50% to about 85%.

26. The telecommunication cable according to claim 23, wherein the amount of inorganic filler is from about 60% to about 80%.

27. The telecommunication cable according to claim 1, wherein the polymeric composition forming said sheath has an elongation at break of 500% or lower.

28. The telecommunication cable according to claim 1, wherein said tubular element is housed in an outer polymeric sheath.

29. The telecommunication cable according to claim 28, wherein said tubular element is an optical sub-unit housing at least one optical fiber within it.

30. The telecommunication cable according to claim 28, wherein said tubular element is an optical unit housing at least one optical sub-unit within it.

31. The telecommunication cable according to claim 1, wherein said tubular element is a buffer tube housing the at least one optical fiber.

32. The telecommunication cable according to claim 31, wherein said buffer tube is defined by a peripheral wall having a thickness of from about 0.05 mm to about 0.5 mm.

* * * * *

UNITED STATES PATENT AND TRADEMARK OFFICE
CERTIFICATE OF CORRECTION

| | | |
|---|---|---|
| PATENT NO. | : 6,993,226 B2 | Page 1 of 1 |
| APPLICATION NO. | : 10/497152 | |
| DATED | : January 31, 2006 | |
| INVENTOR(S) | : Luca Castellani et al. | |

It is certified that error appears in the above-identified patent and that said Letters Patent is hereby corrected as shown below:

Claim 22, column 18, line 18, "radio" should read --ratio--.

Signed and Sealed this

Twelfth Day of September, 2006

JON W. DUDAS
*Director of the United States Patent and Trademark Office*